July 15, 1930.   L. F. HOWARD   1,770,699
RAILWAY TRAFFIC CONTROLLING APPARATUS
Filed Oct. 12, 1928
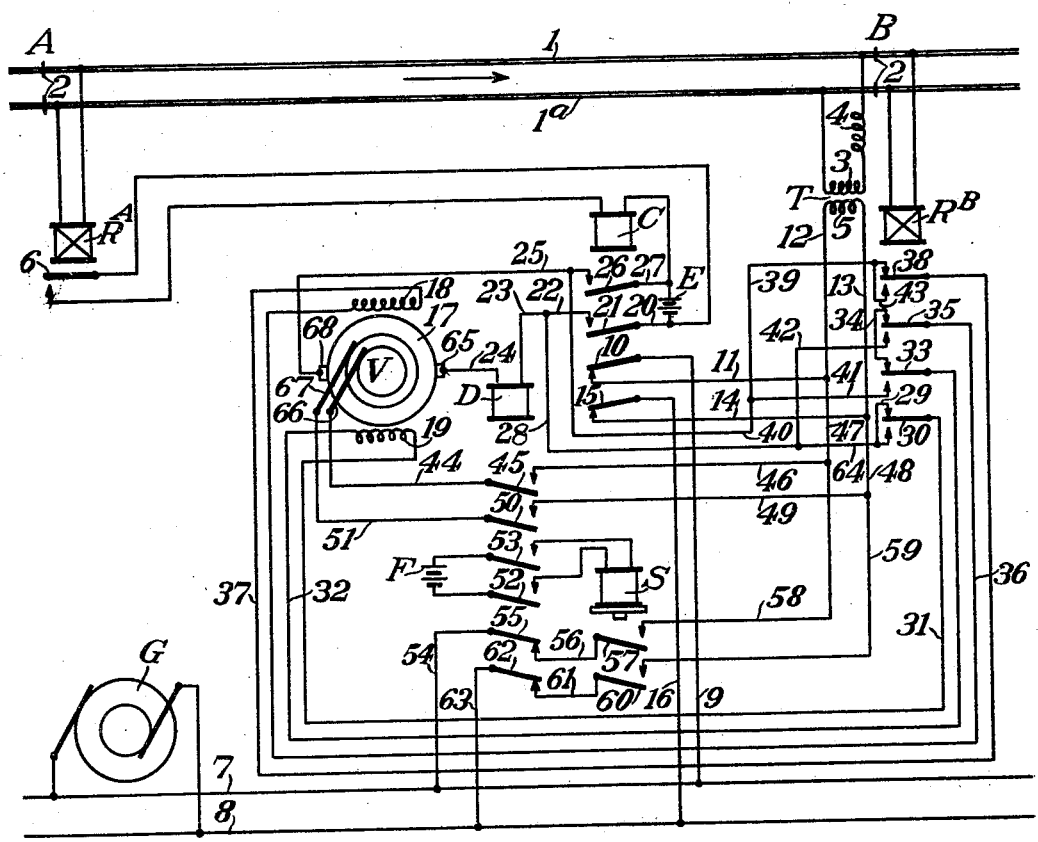
INVENTOR:
L. F. Howard,
BY A. R. Vencill
His ATTORNEY Patented July 15, 1930

1,770,699

UNITED STATES PATENT OFFICE

LEMUEL F. HOWARD, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY-TRAFFIC-CONTROLLING APPARATUS

Application filed October 12, 1928. Serial No. 312,034.

My invention relates to railway traffic controlling apparatus, and particularly to apparatus of the type comprising train carried governing means controlled by energy received from the trackway. More particularly my present invention relates to the trackway portion of such apparatus.

I will describe one form of railway traffic controlling apparatus embodying my invention, and will then point out the novel features thereof in claims.

The accompanying drawing is a diagrammatic view illustrating one form of apparatus embodying my invention.

Referring to the drawing, the reference characters 1 and 1ª designate the track rails of a stretch of railway track over which traffic normally moves in the direction indicated by the arrow. These track rails are divided by means of insulated joints 2 into a plurality of successive track sections, only one of which, A—B, is shown complete in the drawing. This track section is provided with a track transformer T, the secondary 3 of which is connected across the rails adjacent the exit end of the section through the usual impedance 4. The primary 5 of transformer T is at times supplied with signaling current, and is at other times supplied with train controlling current, in a manner which will be described hereinafter. Track section A—B is also provided with a track relay $R^A$ which is connected across the rails adjacent the entrance end of the section. Relay $R^A$ is responsive to the signaling current supplied to the rails, but is not responsive to the train controlling current supplied to the rails.

Associated with section A—B is an approach relay C which is supplied with current from a battery E over a back contact 6 of track relay $R^A$ whenever this relay is deenergized. Also associated with section A—B is a quick release relay D, and a device V for generating alternating train controlling current from a source of unidirectional current. In the form here shown, the device V comprises an inverted rotary converter having two field windings 18 and 19, and an armature 17 provided with direct current input terminals 65 and 68, and alternating current output terminals 66 and 67.

When relay C is energized, armature 17 of converter V is supplied with unidirectional current from a suitable source, such as the battery E, over an input circuit which includes the winding of relay D, and which passes from battery E through wire 20, front contact 21 of relay C, wires 22 and 23, winding of relay D, wire 24, input terminal 65 of converter V, armature 17 of converter V, input terminal 68 of converter V, wire 25, front contact 26 of relay C, and wire 27 back to battery E. Under these conditons, converter V runs at a speed which is dependent upon the field excitation of the converter, and the train controlling current generated by the converter will have a corresponding frequency. The field excitation of converter V may be controlled in any convenient manner. As here shown, the field excitation of converter V is controlled by the relay C, and by the track relay $R^B$ for the section to the right of point B. When relays C and $R^B$ are both energized, the field windings of converter V are connected in series, and current flows from battery E through wire 20, front contact 21 of relay C, wires 22, 28, 64, and 29, front contact 30 of relay $R^B$, wire 31, field winding 19 of converter V, wire 32, front contact 33 of relay $R^B$, wire 34, front contact 35 of relay $R^B$, wire 36, field winding 18 of converter V, wire 37, front contact 38 of relay $R^B$, wires 39 and 40, front contact 26 of relay C, and wire 27 back to battery E. Under these conditions, converter V runs at its normal speed, and the current generated by the converter has its normal frequency. When relay C is energized, and relay $R^B$ is de-energized, the field windings of converter V are connected in multiple. Current then flows from battery E through wire 20, front contact 21 of relay C, wires 22, 28, and 64, back contact 30 of relay $R^B$, wire 31, field winding 19 of converter V, wire 32, back contact 33 of relay $R^B$, wires 41 and 40, front contact 26 of relay C, and wire 27 back to battery E. Current also flows from battery E through wire 20, front contact 21 of relay C, wires 22, 28, and 42, back contact 35 of relay $R^B$, wire 36, field winding 18 of converter V, wire 37, back contact 38 of relay $R^B$, wires 43, 39, and 40, front contact 26 of relay C, and wire 27 back to battery E. Under these conditions, converter V runs at a reduced speed, and the train controlling current generated by the converter has a reduced frequency.

As pointed out hereinbefore, relay D is included in the input circuit for converter V, and the relay is designed in such manner that a current which is slightly in excess of the normal no load current for converter V is required to operate relay D. When the input circuit for converter V becomes closed, the initial rush of current which is supplied to converter V is sufficiently large to operate relay D. After relay D has become closed, train controlling current is supplied to the primary 5 of transformer T from converter V over a circuit which may be traced from output terminal 66 of converter V, through wire 44, front contact 45 of relay D, wires 46, 47, and 12, primary 5 of transformer T, wires 13, 48, and 49, front contact 50 of relay D, and wire 51 back to output terminal 67 of converter V.

The train controlling current supplied to the rails from converter V may be used to control train carried governing apparatus in any suitable manner.

The primary 5 of transformer T is also supplied at times with signaling current having a frequency which is different from either the normal or reduced frequencies of the train controlling current supplied to primary 5. As here shown, the immediate source of such signaling current is a pair of line wires 7 and 8 which are supplied with current from an alternator G. In actual practice, the line wires 7 and 8 will usually also supply current to other apparatus not shown in the drawing, but which might be undesirably affected by the presence, in the line wires, of currents other than the signaling current. It is desirable therefore to connect the line wires 7 and 8 with the primary 5 of transformer T in such manner that there can be no transfer of energy from converter V to line wires 7 and 8. To accomplish this result, I have connected the line wires 7 and 8 with the primary 5 of transformer T over a normal circuit which is controlled by relay C, and which passes from line wire 7 through wire 9, back contact 10 of relay C, wires 11 and 12, primary 5 of transformer T, wires 13 and 14, back contact 15 of relay C, and wire 16 back to line wire 8. This circuit is closed only when relay C is de-energized, and there cannot, therefore, be any transfer of energy from converter V to line wires 7 and 8 over this circuit, because, when converter V is operating, relay C is energized, and this circuit is open.

The reference character S designates a slow release relay which is connected with a battery F over front contacts 52 and 53 of relay D. Due to the slow release characteristics of relay S, if relay D is closed and then opened, the front contacts of relay S will remain closed for a short interval of time after relay D is opened. During this interval of time the line wires 7 and 8 are connected with the primary 5 of transformer T over an auxiliary circuit which passes from line wire 7, through wire 54, back contact 55 of relay D, wire 56, front contact 57 of relay S, wires 58, 47, and 12, secondary 5 of transformer T, wires 13, 48, and 59, front contact 60 of relay S, wire 61, back contact 62 of relay D, wire 63, and line wire 8 back to alternator G. It will be noted that when this circuit is closed, converter V is disconnected from primary 5 of transformer T at front contacts 45 and 50 of relay D, and it is therefore impossible for current from converter V to be supplied to line wires 7 and 8 over this circuit.

As shown in the drawing, track section A—B is unoccupied, and relay $R^A$ is energized. Relay C is therefore de-energized so that converter V is at rest, and the rails of section A—B are supplied with signaling current from line wires 7 and 8 over back contacts 10 and 15 of relay C. Slow release relay S is de-energized, and the auxiliary circuit for primary 5 of transformer T is open at front contacts 57 and 60 of this relay.

I will now assume that a train enters section A—B. Track relay $R^A$ then becomes de-energized, and the circuit for approach relay C is closed at back contact 6 of relay $R^A$. When relay C picks up, the supply of signaling current to the primary 5 of transformer T is interrupted because the line wires 7 and 8 are disconnected from the primary 5 of transformer T at back contacts 10 and 15 of relay C. At the same time, the input circuit for rotary converter V is closed at front contacts 26 and 21 of relay C, and converter V starts to operate. The initial rush of current which flows in the input circuit for converter V picks up relay D, and the rails of section A—B are then supplied with train controlling current of normal or reduced frequency depending upon whether track relay $R^B$ is energized or de-energized. Since section A—B is occupied by a train, the wheels and axles of which short circuit the secondary 3 of transformer T, converter V draws an input current which is considerably in excess of its no-load value, and it follows that relay D is held up as long as the train occupies section A—B. When relay D is picked up, slow release relay S is energized, but the auxiliary circuit for the primary 5 of transformer T is then open at back contacts 55 and 62 of relay D. It will be apparent, therefore, that when a train enters section A—B, the primary 5 of transformer T is supplied with train controlling current from converter V, but the supply of signaling current to primary 5 of transformer T from line wires 7 and 8 is then interrupted at back contacts 10 and 15 of relay C, and front contacts 55 and 62 of relay D, so that it is impossible for train controlling current from converter V to be supplied to line wires 7 and 8 under these conditions.

If, now, the train passes out of section A—B, the input current drawn by converter V will decrease to its no load value because the secondary 3 of transformer T is no longer short circuited by the wheels and axles of the train. Relay D then opens because, as was previously pointed out, a current which is slightly in excess of the no load current for converter V is required to operate relay D. When front contacts 45 and 50 of relay D open, converter V is disconnected from primary 5 of transformer T; and when front contacts 52 and 53 of relay D open, relay S becomes de-energized. Relay S does not immediately open its front contacts, however, because of its slow release characteristics. As a result, the auxiliary circuit for primary 5 of transformer T is closed for the short interval of time necessary for the front contacts 57 and 60 of relay S to open after the back contacts 55 and 62 of relay D are closed, and the primary 5 of transformer T is supplied with signaling current during this interval of time from line wires 7 and 8. This signaling current picks up track relay R^A. When track relay R^A picks up, relay C becomes de-energized, thereby opening the input circuit for converter V at front contacts 26 and 21 of relay C, and closing the normal circuit for the primary 5 of transformer T at back contacts 10 and 15 of relay C. Relay R^A is then held up by the signaling current supplied to the rails from line wires 7 and 8 over the normal circuit, and the apparatus is maintained in the position in which it is shown in the drawing until the next train enters section A—B to again de-energize relay R^A.

It follows that with apparatus embodying my invention it is impossible for the train controlling current to be supplied to the line wires which supply the signaling current to transformer T. Furthermore, it is impossible for signaling current to be supplied to the device which supplies the train controlling current to transformer T. These features are particularly valuable where signaling apparatus other than the track relay is supplied with energy from the source of signaling current, and where the train controlling current, being of a different frequency from the signaling current, would, if permitted to be supplied to such signaling apparatus, cause undesirable operation of such apparatus.

It should be pointed out that the apparatus here used to supply train controlling currents to the trackway receives energy from a source of direct current. This feature of my invention is particularly valuable when it is desired to supply the rails with train controlling current in territory where alternating current is not available.

Although I have herein shown and described only one form of railway traffic controlling apparatus embodying my invention, it is understood that various changes and modifications may be made therein within the scope of the appended claims without departing from the spirit and scope of my invention.

Having thus described my invention, what I claim is:

1. In combination, a stretch of railway track, an inverted rotary converter for said stretch comprising an armature and two field windings, means connected with said armature for supplying the rails of said stretch with train controlling current, a source of unidirectional current connected with said armature, and means controlled by traffic conditions in advance of said stretch for at times supplying current to the field windings of said converter in series, and for at other times supplying current to the field windings of said converter in multiple.

2. In combination, a stretch of railway track, an inverted rotary converter having its alternating current output terminals connected with the rails of said stretch for supplying said rails with train controlling current and provided with two field windings, a source of unidirectional current connected with the direct current armature windings of said converter, and means controlled by traffic conditions for at times supplying current from said source to the field windings of said converter connected in series and for at other times supplying current from said source to the field windings of said converter connected in multiple.

3. In combination, a stretch of railway track, a rotary converter for said stretch comprising two field windings, a track transformer having its secondary connected with the rails of said stretch and having its primary connected with the alternating current terminals of said converter, a source of unidirectional current connected with the direct current terminals of said converter, and means controlled by traffic conditions in advance for at times supplying current from said source to the field windings of said converter connected in multiple and for at other times supplying current to the field windings of said converter connected in series.

4. In combination, a stretch of railway track, a track relay connected with the rails of said stretch, an approach relay controlled by said track relay, a source of signaling current, means controlled by said approach relay for at times supplying the rails of said stretch with current from said source of signaling current, a source of train controlling current controlled by said approach relay, and means including a contact arranged to be closed when the rails of said stretch are supplied with current from said source of train controlling current for at times supplying the rails of the stretch with current from said source of train controlling current.

5. In combination, a stretch of railway track, a track relay connected with the rails of said stretch, an approach relay controlled by said track relay, a source of train controlling current controlled by said approach relay, means for at times supplying the rails of said stretch with current from said source of train controlling current, a first contact arranged to be closed when current from said source of train controlling current is being supplied to the rails, a slow release relay controlled by said first contact, a second contact arranged to be closed when the supply of current from said source of train controlling current to the rails of said stretch is interrupted, a source of signaling current, and means controlled by said second contact and said slow release relay for at times supplying the rails of said stretch with current from said source of signaling current.

6. In combination, a stretch of railway track, a track relay connected with the rails of said stretch, an approach relay controlled by said track relay, a source of train controlling current controlled by said approach relay, means for at times supplying the rails of said stretch with current from said source of train controlling current, a first contact arranged to be closed when current from said source of train controlling current is being supplied to the rails, a slow release relay controlled by said first contact, a second contact arranged to be closed when the supply of current from said source of train controlling current to the rails of said stretch is interrupted, a source of signaling current, means controlled by said approach relay for normally supplying the rails of said stretch with current from said source of signaling current, and means controlled by said second contact and said slow release relay for also supplying the rails of said stretch at times with current from said source of signaling current.

7. In combination, a stretch of railway track, a track relay connected with the rails of said stretch, an approach relay controlled by said track relay, a source of train controlling current controlled by said approach relay, means for at times supplying the rails of said stretch with current from said source of train controlling current, a quick release relay arranged to be closed when current from said source of train controlling current is being supplied to the rails, a slow release relay controlled by said quick release relay, a source of signaling current, means controlled by said approach relay for normally supplying the rails with current from said source of signaling current, and other means controlled by said quick release relay and said slow release relay for supplying the rails at other times with current from said source of signaling current.

8. In combination, a stretch of railway track, a source of alternating signaling current, an approach relay, means controlled by said approach relay for supplying the rails of said stretch at times with current from said source, an inverted rotary converter controlled by said approach relay, means controlled by traffic conditions in said stretch for at times supplying the rails of said stretch with alternating current from said converter in such manner that current from said converter is prevented from being supplied to said source, a track relay connected with the rails of said stretch and responsive to the current supplied to the rails from said source but not responsive to the current supplied to the rails from said converter, and means controlled by said track relay for controlling said approach relay.

9. In combination, a stretch of railway track, an approach relay, a track transformer having its secondary connected with the rails of said stretch, a source of alternating signaling current, means for supplying the primary of said transformer with signaling current from said source when said approach relay is de-energized, an inverted rotary converter, means for supplying unidirectional current to said converter when said approach relay is energized, means for supplying the primary of said transformer with alternating current from said converter when said approach relay is energized and said stretch is occupied, a track relay connected with the rails of said stretch and responsive to the alternating current supplied to the rails from said source but not responsive to the alternating current supplied to the rails from said converter, and means controlled by said track relay for controlling said approach relay.

10. In combination, a stretch of railway track, a track relay connected with the rails of said stretch, an approach relay controlled by said track relay, a track transformer comprising a primary and a secondary and having its secondary connected with the rails of said stretch, a source of signaling current, a first circuit for the primary of said transformer including said source and a back contact of said approach relay, a quick release relay, a slow release relay controlled by said quick release relay; a second circuit for the primary of said transformer including said source, a back contact of said quick release relay, and a front contact of said slow release relay; a device for generating train governing current from a source of unidirectional current, an input circuit for said device including said quick release relay and a front contact of said approach relay, and a third circuit for the primary of said transformer supplied with alternating current from said device and including a front contact of said quick release relay.

11. In combination, a stretch of railway track, a track relay connected with the rails of said stretch, a track transformer having its secondary connected with the rails of said stretch, an approach relay controlled by said track relay, a source of alternating signaling current connected with the primary of said transformer over a front contact of said approach relay, an inverted rotary converter, a quick release relay, an input circuit for said rotary converter including said quick release relay and a front contact of said approach relay, an output circuit for said converter including the primary of said transformer and a front contact of said quick release relay, a slow release relay controlled by said quick release relay, and means for at times connecting the primary of said transformer with said source over a back contact of said quick release relay and a front contact of said slow release relay.

12. In combination, a stretch of railway track, a track relay connected with the rails of said stretch, an approach relay controlled by said track relay, an inverted rotary converter, means effective when said approach relay is energized for supplying said converter with unidirectional current, a quick release relay arranged to be closed when and only when the unidirectional current supplied to said converter exceeds a predetermined amount, a track transformer having its secondary connected with the rails of said stretch and having its primary connected with said converter over front contacts of said quick release relay, a slow release relay controlled by said quick release relay, and a source of signaling current connected at times with the primary of said transformer over a front contact of said approach relay and connected at other times with the primary of said transformer over a back contact of said quick release relay and a front contact of said slow release relay.

13. In combination, a stretch of railway track, a track relay connected with the rails of said stretch, an approach relay controlled by a back contact of said track relay, an inverted rotary converter, a quick release relay, a source of unidirectional current connected with the input terminals of said converter in series with said quick release relay and a front contact of said approach relay, a track transformer having its secondary connected with the rails of said stretch and having its primary connected with the output terminals of said converter in series with a front contact of said quick release relay, a slow release relay arranged to be energized when said quick release relay is energized, a source of signaling current, means for at times connecting said source with the primary of said transformer over a first circuit which includes a front contact of said approach relay, and means for at other times connecting said source of signaling current with the primary of said transformer over a circuit which includes a back contact of said quick release relay and a front contact of said slow release relay.

14. In combination, a stretch of railway track, a track relay connected with the rails of said stretch and responsive to alternating current of a particular frequency, an approach relay arranged to be energized when said track relay is de-energized, a source of alternating current of the particular frequency to which the track relay is responsive, means controlled by a back contact of said approach relay for normally supplying the rails of said stretch with current from said source, an inverted rotary converter for generating train controlling current having a frequency different from the fequency of the current supplied to the rails from said source, a quick release relay, an input circuit for said converter controlled by a front contact of said approach relay and including the winding of said quick release relay, means controlled by a front contact of said quick release relay for supplying the rails of said stretch with train controlling current from said converter, a slow release relay controlled by a front contact of said quick release relay, and means controlled by a back contact of said quick release relay and a front contact of said slow release relay for at times supplying the rails of said stretch with current from said source.

15. In combination, a stretch of railway track, a track relay connected with the rails of said stretch and responsive to alternating current of a particular frequency, an approach relay controlled by said track relay, a source of alternating signaling current having the particular frequency to which the track relay is responsive, means controlled by the approach relay for at times supplying the rails of said stretch with current from said source of signaling current, an inverted rotary converter for generating train controlling current having frequencies which are different from the frequency of the signaling current and comprising an armature and two field windings, a source of unidirectional current, a quick release relay, means controlled by said approach relay and including the winding of said quick release relay for supplying the armature of said converter with current from said source of unitional current to the field windings of said approach relay and by traffic conditions in advance of said stretch for at times supplying current from said source of unidirectional current to the field windings of said converter connected in series and for at other times supplying current from said source of unidirectional current to the field windings of said converter connected in multiple to cause the current generated by the converter to have respectively a normal or a reduced frequency, means controlled by the quick release relay for supplying train controlling current from said converter to the rails of said stretch, a slow release relay controlled by said quick release relay, and means controlled by said quick release relay and said slow release relay for at times supplying the rails of said stretch with current from said source of signaling current.

In testimony whereof I affix my signature.

LEMUEL F. HOWARD.